J. B. GALLAHER.
SAW SET.
APPLICATION FILED OCT. 8, 1909.
977,861.
Patented Dec. 6, 1910.
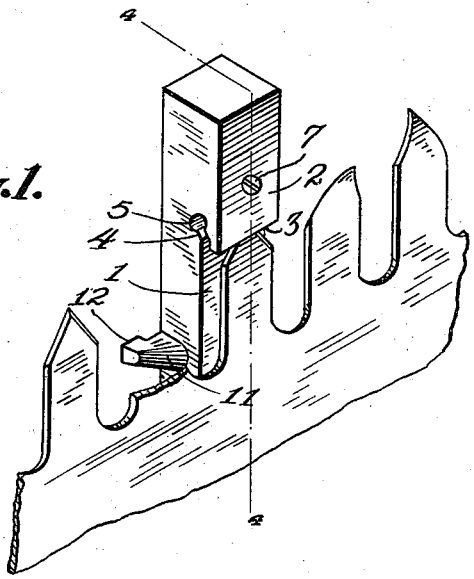
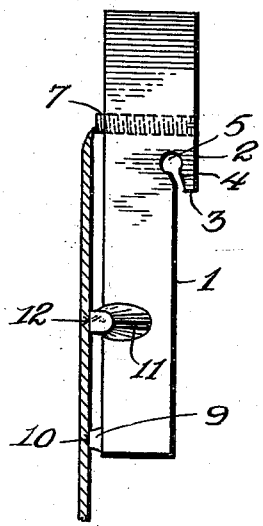
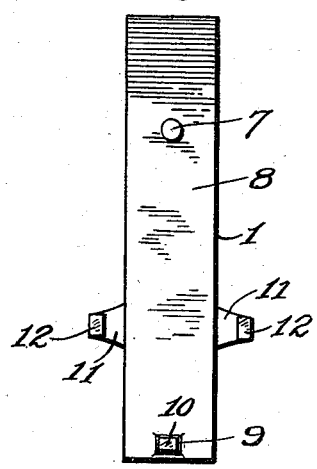
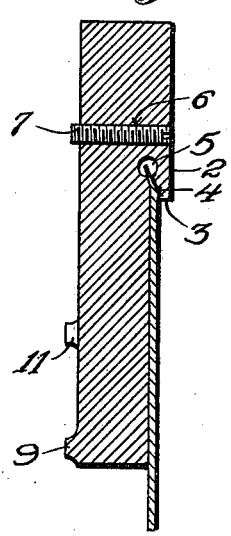
Witnesses
Inventor
Jesse B. Gallaher,

UNITED STATES PATENT OFFICE.

JESSE B. GALLAHER, OF PENRITH, WASHINGTON.

SAW-SET.

977,861.   Specification of Letters Patent.   Patented Dec. 6, 1910.

Application filed October 8, 1909. Serial No. 521,715.

*To all whom it may concern:*

Be it known that I, JESSE B. GALLAHER, a citizen of the United States, residing at Penrith, in the county of Stevens and State of Washington, have invented certain new and useful Improvements in Saw-Sets, of which the following is a specification, reference being had therein to the accompanying drawing.

This invention relates to saw sets and the principal object of the same is to provide a tool of the type specified in which simple means are provided for setting the teeth at the desired angle and also means whereby the set of the teeth may be readily gaged.

The invention also provides means whereby the teeth of a saw may be straightened on the improved tool.

In carrying out the objects of the invention generally stated above it will be understood that the essential features of the same are necessarily susceptible of changes in details and structural arrangements, one preferred and practical embodiment of which is shown in the accompanying drawing, wherein:

Figure 1 is a perspective view of the improved saw set showing the same in use. Fig. 2 is a view in side elevation of the saw set showing the same used for gaging the set of a tooth. Fig. 3 is a rear elevation. Fig. 4 is a central vertical sectional view taken substantially on the line 4—4 Fig. 1.

Referring to said drawing by numerals it will be observed that the improved saw set consists of an elongated body the front (1) of which is flat and provided with an overhanging end portion (2) the end (3) of which acts as a guide to the inclined slot (4) the inner end of which terminates in a cylindrical recess (5). The slot and recess extend the entire width of the said front (1). A threaded opening (6) is formed transversely through the overhanging end portion (2) for the reception of a set screw (7), said screw being adapted to project laterally beyond the rear surface 8 and at the longitudinal center thereof. A lug (9) is located at the lower end of said surface (8) and in alinement with the projected end of the screw (7), said lug having a flat outer head (10).

A pair of oppositely disposed lugs (11) project laterally from the sides of the tool, said lugs having a widened base and a substantially right angular outer end (12) the flat heads of which project beyond the surface (8) of the tool, the flat heads of said lugs being in the same plane as the flat head (10) of the lug (9).

In use, the end of the tooth to be set is inserted into the slot (4) as shown in Fig. 1, and the tool is struck a sharp blow by a hammer or the like to force the tooth into the recess (5), as shown in Fig. 4, which gives the tooth the desired "set," after which the tool may be moved transversely of the tooth to release the same. It will be seen from the foregoing that the end of the overhanging portion serves as a guide to the inclined slot which gives the bend or set to the tooth, and by means of the cylindrical end recess, ample clearance is had for the end of the teeth so that the cutting edge of the tooth will not be damaged during the bending or "setting" operation.

As is suggested in Fig. 2, the set screw (7) is used to gage the bend or "set" to be made to the tooth, said screw being projected beyond the rear surface of the tooth the desired distance, and the saw held so that the tooth will rest upon the flat heads of the lugs (9) and (11). If the tooth has been bent too much, the same may be laid upon the flat surface of the front of the tool and straightened by means of a hammer or other convenient tool.

What I claim is:

A saw-set comprising a body, said body being thickened for a portion of its length, one surface of said body being provided with a longitudinal slot extending into said thickened portion, the outer portion of said slot being parallel to the longitudinal axis of said body, and the inner portion being disposed at an angle to said outer portion and terminating in an enlarged aperture.

In testimony whereof I hereunto affix my signature in presence of two witnesses.

JESSE B. GALLAHER.

Witnesses:
F. M. SMITH,
J. A. MOLLES.